United States Patent [19]

Bierlein

[11] Patent Number: 5,152,660
[45] Date of Patent: Oct. 6, 1992

[54] TRANSFER ARM FOR SUPPORTING WORKPIECES

[75] Inventor: Stephen E. Bierlein, Flint, Mich.

[73] Assignee: Atlas Technologies, Inc., Fenton, Mich.

[21] Appl. No.: 702,782

[22] Filed: May 17, 1991

[51] Int. Cl.⁵ ............................................. B21J 13/08
[52] U.S. Cl. ................................. 414/749; 188/67;
403/109; 403/28; 72/405; 72/422; 72/12;
901/46; 901/20
[58] Field of Search .................. 414/749, 751; 901/32,
901/33, 35, 46, 20, 9, 50, 49, 19, 27, 30; 188/67,
276; 403/265, 266, 268, 109, 28, 32; 72/12, 405,
422; 16/48.5

[56] References Cited

U.S. PATENT DOCUMENTS

| | | |
|---|---|---|
| 326,469 | 9/1885 | Youngs . |
| 4,213,227 | 7/1980 | McCabe .................. 16/48.5 |
| 4,470,484 | 9/1984 | Norgren .................. 188/67 |
| 4,492,513 | 1/1985 | Weck et al. ............. 901/50 X |
| 4,654,192 | 3/1987 | Huttes et al. ........... 403/28 X |
| 4,842,106 | 6/1989 | Ludwig et al. ......... 188/276 X |
| 4,887,446 | 12/1989 | Maher ..................... 198/621 X |
| 4,988,909 | 2/1991 | Bouligny, Jr. et al. ......... 188/67 X |
| 5,060,888 | 10/1991 | Vezain et al. ............ 403/28 X |

FOREIGN PATENT DOCUMENTS

| | | | |
|---|---|---|---|
| 0929431 | 5/1982 | U.S.S.R. ........................... | 901/19 |
| 1235724 | 6/1986 | U.S.S.R. ........................... | 901/50 |

*Primary Examiner*—Michael S. Huppert
*Assistant Examiner*—William M. Hienz
*Attorney, Agent, or Firm*—Learman & McCulloch

[57] ABSTRACT

A workpiece transfer arm for supporting and moving a workpiece from one position to another has a telescopic arm one end of which is secured to a mounting bracket and the opposite end of which carries a workpiece support for engagement by the workpiece. The telescopic arm has a rod accommodated in a sleeve. The rod has a plurality of annular grooves occupied by a thermoplastic adhesive which, when at ambient temperature, is solid and fixes the rod in the sleeve. At elevated temperatures, however, the adhesive liquefies and enables relative movement between the sleeve and the rod to enable the position of the workpiece support to be adjusted.

18 Claims, 2 Drawing Sheets

TRANSFER ARM FOR SUPPORTING WORKPIECES

FIELD OF THE INVENTION

This invention relates to a workpiece transfer apparatus capable of lifting, supporting, and transferring a workpiece from one station to another, and more particularly to a workpiece supporting arm that is linearly and rotatably adjustable and maintained in a selected position of adjustment by a thermoplastic adhesive.

BACKGROUND OF THE INVENTION

In the manufacture of a sheet metal workpiece into a finished product the workpiece may be moved successively through a plurality of stations at each of which the workpiece may or may not be subjected to an operation. Apparatus of this kind typically is incorporated in progressive die stamping machinery having a plurality of stations arranged along a common longitudinal axis.

One example of a progressive die stamping press is disclosed in U.S. Pat. No. 4,887,446 issued Dec. 19, 1989. The workpiece transfer apparatus is adjacent, but separate from, the die stations of the stamping press. Elongate rails are positioned on opposite sides of the die stations and are controlled by actuators. Extending inwardly from the rails, i.e., toward the die stations, is a plurality of transfer arms arranged in sets of four for each die station. The transfer arms are adapted to engage a workpiece on opposite sides thereof and each transfer arm has a support at its distal end for engaging and supporting the workpiece.

A disadvantage of known transfer arms is that they are not adjustable to accommodate workpieces of different size or shape. As a consequence, when the machinery is adjusted to accommodate workpieces of different size or shape, the transfer arms used with one size and shape workpiece must be replaced with arms capable of accommodating a different size or shaped workpiece. The necessity of replacing one set of transfer arms with another is a time consuming and expensive undertaking.

SUMMARY OF THE INVENTION

Apparatus constructed in accordance with the invention provides an adjustable workpiece transfer arm of the type adapted to transfer a workpiece successively from one station to another. The transfer arm includes a mounting bracket for fixed attachment to a movable transfer rail, an arm formed of two relatively adjustable sections extending from the mounting bracket transversely of the rail, a workpiece support member carried by the arm at its distal end, and means for adjusting the length of the arm and the position of the workpiece support member. The invention is characterized by thermoplastic bonding means for fixing the workpiece support member in a selected position of adjustment at ambient operating temperatures, but such securing means is responsive to an increase in its temperature to enable adjustment of the workpiece support member relative to the transfer rail on which the arm is mounted.

To effect adjustment of the two sections of the transfer arm, the bonding means is simply heated to an elevated temperature at which the thermoplastic material liquefies, thereby permitting adjustment of the arm sections and the workpiece support member. Following adjustment the thermoplastic material is permitted to cool to the lower, ambient temperature at which it solidifies and maintains the support member in the adjusted position.

THE DRAWINGS

DETAILED DESCRIPTION

Figure 1:
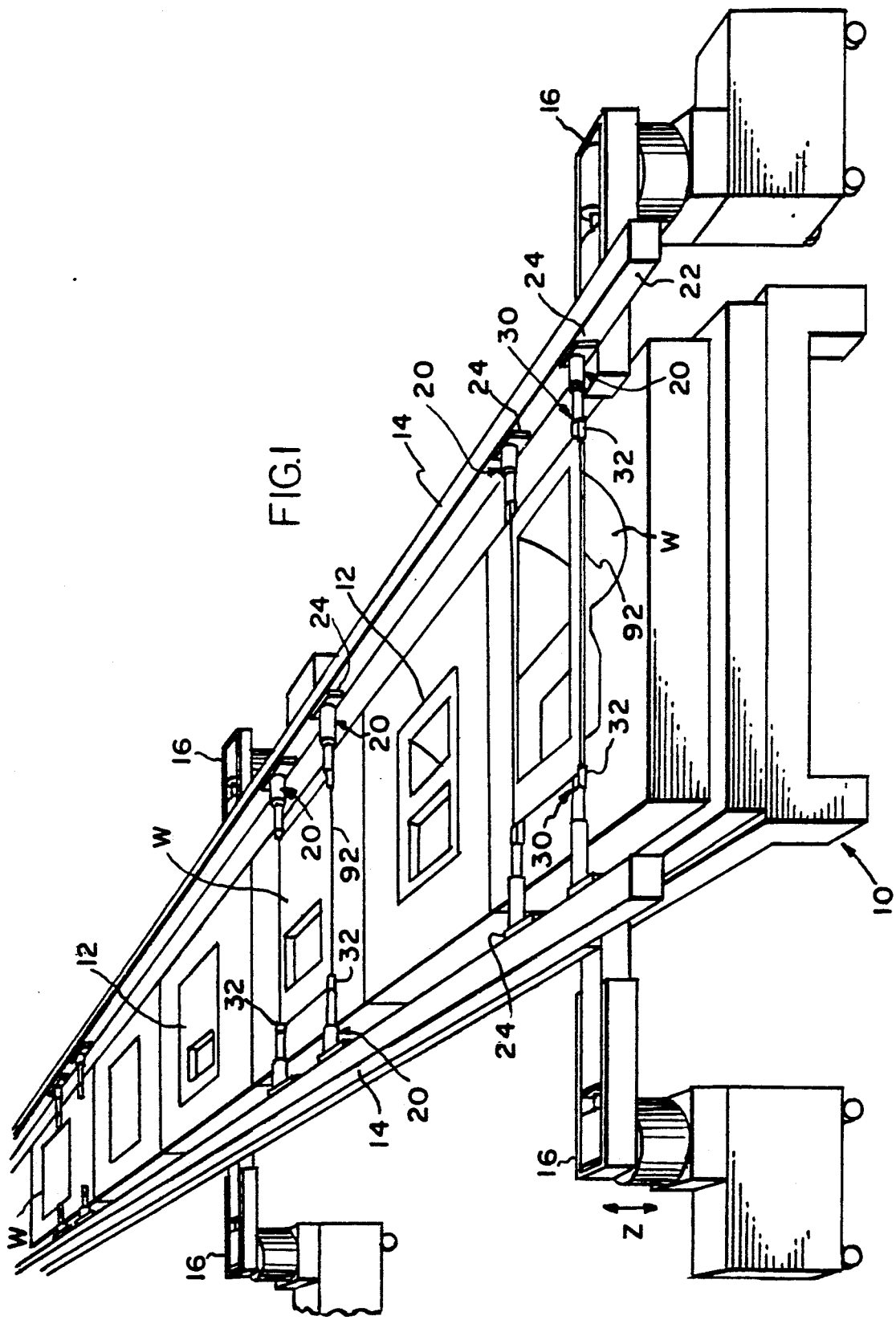
FIG. 1 is a diagrammatic, perspective view of a known progressive stamping press incorporating transfer arms constructed according to the invention.

Workpiece transfer apparatus of the class to which the invention relates is adapted for use with machinery such as a progressive stamping press indicated generally at 10 in FIG. 1. The press is of the type wherein a workpiece W is movable successively to progressive die stations 12. The apparatus shown in FIG. 1 corresponds to that disclosed in the aforementioned U.S. Pat. No. 4,887,446 to which reference may be had for a detailed description. Briefly, however, the press 10 includes a pair of parallel, elongate transfer rails 14 on opposite sides of the die stations 12. Actuators 16 function to move the rails 14, in unison, first laterally toward the respective workpieces W in their die stations 12, and then upwardly to lift the workpieces W from the stations 12, then longitudinally to transfer the workpieces to the next adjacent die station 12, then downwardly to deposit the workpieces W in the adjacent die stations 12. and finally laterally outwardly from the workpieces and return them to the initial starting position.

As shown in FIG. 1, each workpiece W has a generally rectangular shape. The most efficient way of supporting the workpieces W for movement from one die station 12 to another is to grasp each of the four corners of each workpiece W. This is accomplished by providing a plurality of sets of four transfer arms 20 each, each of which extends laterally inwardly from an inner face 22 of the associated transfer rail 14.

Each transfer arm 20 shown in FIG. 1 omits certain parts incorporated in the preferred embodiment of the invention and such parts have been omitted from FIG. 1 in the interest of clarity. The omitted parts are disclosed in the other figures of the drawings.

Each arm 20 embodying the invention comprises a plate-like mounting bracket 24 having a pair of elongate slots 26. The bracket 24 is fixed to the inner face 22 of the adjacent transfer rails 14 by bolts (not shown) which extend through the slots 26 and are secured to the transfer rails 14. The elongation of the slots 26 permits the arm to be adjusted vertically relative to the rail.

Each arm 20 extends in the direction of a die station 12 from its bracket 24 and has at its free distal end 30 a workpiece support member or shovel 32 for engaging and supporting a workpiece W. The support member 32 is L-shaped and has a vertical wall 34 and a horizontal wall 36. The vertical and horizontal walls 34, 36 have chamfered leading edges 38, 40, respectively, to facilitate embracing a corner of the workpiece W by the shovel. Each shovel 32 includes a cylindrical tenon 42 extending rearwardly therefrom.

Each transfer arm 20 comprises an elongate, cylindrical rod section 46 open at that end adjacent the shovel 32 and in which the tenon 42 is fixed. Each arm also includes a cylindrical sleeve section 50 secured to and extending from the mounting bracket 24. The rod 46 snugly and telescopically is accommodated in the sleeve 50 in surface-to-surface engagement therewith, but the rod is slideable and rotatable within the sleeve.

To secure the rod 46 in any selected one of a plurality of rotary and axially adjusted positions in the sleeve 50 a thermoplastic securing means 52 is provided. Preferably, the thermoplastic material comprises a known hot melt adhesive interposed between the rod 46 and the inner surface of the sleeve 50. At ambient temperatures the adhesive is solid and forms a secure, adhesive bond between the rod and the sleeve to prevent relative movement therebetween. At temperatures at and above the liquefication temperature of the adhesive, however, the adhesive liquefies, thereby enabling relative movement between the members 46 and 50. When the thermoplastic material cools from such elevated temperature to ambient temperature, the adhesive again solidifies to form an adhesive bond between the members 46 and 50 and maintain them in fixed relation.

Figure 2:
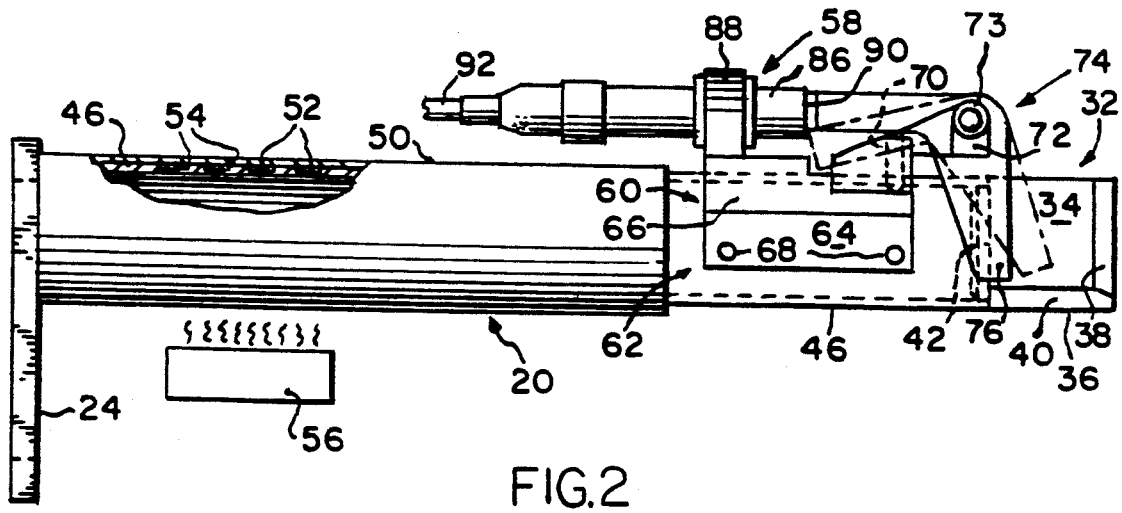
FIG. 2 is a greatly enlarged, side elevational view, partly in section, of a transfer arm constructed according to the invention.

Preferably, the member 46 is provided with a plurality of grooves 54 for trapping the thermoplastic material therein. As is best shown in FIG. 2, the grooves 54 are annular and spaced from one another longitudinally of the rod 46. Hence, the adhesive material is trapped, or caught, in the grooves even though the rod 46 is moved axially or rotatably within the sleeve so that a sufficient amount of the adhesive material always occupies the space between the members 46 and 50 to form a secure, binding force therebetween upon resolidification of the adhesive.

A heat source 56 is provided to heat that zone of the members 46 and 50 occupied by the adhesive to a temperature at which the adhesive liquefies. The heat source may be any one of a number of radiant heaters, such as a common hair dryer. Heat from the source 56 is applied to the exterior of the sleeve 50 at the zone of the adhesive 52 until an operator manually can adjust the position of the rod 46, whereupon the rod may be axially and/or rotatably adjusted to a selected position following which heating is discontinued enabling the adhesive material to cool and resolidify.

Preferably the arm 20 supports sensor means 58 (not illustrated in FIG. 1) adjacent the shovel 32 for sensing when a workpiece W properly is seated on the shovel. The sensor means 58 normally is carried by and movable with the rod 46 so that the sensor means always remains in the optimum location relative to the shovel 32.

The sensor means is movably mounted on the rod 46 by mounting means 60 comprising a yoke or saddle 62 having spaced, parallel legs 64 straddling the rod 46 and being joined at their upper ends by a crown 66 having an upper surface spaced from and confronting the rod 46. Screws or other suitable fasteners 68 are provided to stabilize the yoke 62 on the rod 46. The height of the legs 64 is such as to enable the entire yoke 62 to be supported on the sleeve 50, rather than on the rod 46, in those instances in which the shovel 32 is adjusted to a position relatively close to the free end of the sleeve 50. In this event, a set screw 70 may be provided to stabilize the mounting means 60 on the sleeve 50.

The mounting means 60 further includes a pair of ears 72 extending upwardly and forwardly of the yoke 62. Pivotally mounted on the ears 72 by pivot pins 73 is a sensor actuating bail 74 (not shown in FIG. 1). The bail has spaced limbs 76 and 78 terminating in free ends 80, 82 which normally project beyond the vertical wall 34 of the shovel 32, as is shown in dotted lines in FIG. 2. The opposite ends of the limbs 76, 78 are joined together by an integral crossbar 84. The bail is so connected that gravity causes it normally to occupy the position shown in dash lines in FIG. 2.

Figure 3:
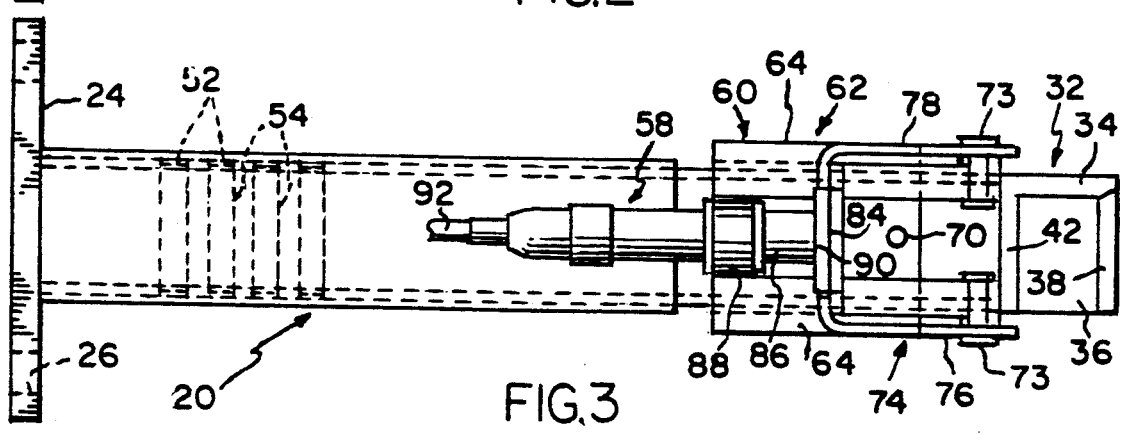
FIG. 3 is a top plan view of the arm.
Figure 4:
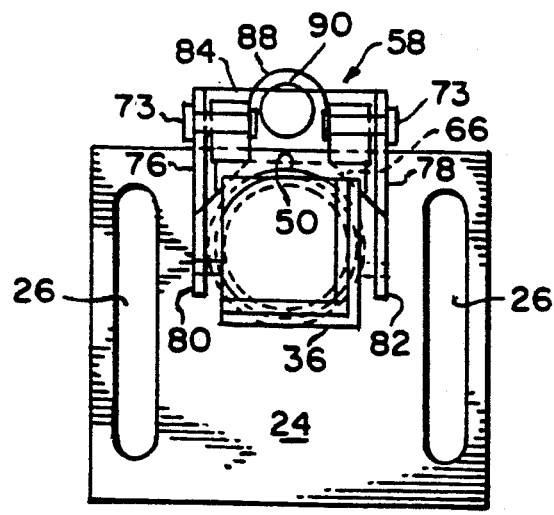
FIG. 4 is an end elevational view of the arm.

The sensor means 58 includes a proximity sensor 86 (not shown in FIG. I) supported at a level above that of the yoke 62 by the mounting means 60. As is shown best in FIGS. 2 and 3, an extension 88 projects upwardly from the yoke 62 and has an opening therein for the accommodation of the proximity sensor 86. One end 90 of the proximity sensor occupies a position that is closely adjacent the crossbar 84 of the bail when the latter is in an active position shown in full lines in FIG. 2 and in FIG. 4. The bail moves to such position in response to the seating of a workpiece in the shovel 32. As the bail moves to a position in which the crossbar 84 confronts the end 90 of the sensor, the latter generates an electrical signal which is transmitted via a conductor 92 to means (not shown) operable to condition the associated transfer rail 14 for movement. A suitable proximity sensor is a Truck inductive sensor, model number Bi-2-G12=AZ31X.

This disclosure is representative of a presently preferred embodiment of the invention, but is intended to be illustrative rather than definitive thereof. The invention is defined in the claims.

I claim:

1. Workpiece transfer apparatus for transferring a workpiece from one position to another comprising an adjustable length transfer arm; support means at one end of said arm for supporting a workpiece; and thermally sensitive securing means for fixing said arm in a selected position of lengthwise adjustment, said securing means comprising a bonding material which is solid and disables lengthwise adjustment of said arm at ambient temperature and which liquefies at an elevated temperature and enables such adjustment at such elevated temperature.

2. Apparatus according to claim 1 wherein said securing means comprises a thermoplastic adhesive.

3. Apparatus according to claim 1 wherein said transfer arm comprises a pair of relatively telescoping members.

4. Apparatus according to claim 3 wherein said bonding material is interposed between said telescoping members in surface-to-surface engagement therewith.

5. Apparatus according to claim 4 wherein both of said members are cylindrical, thereby enabling relative rotation of said members.

6. Apparatus according to claim 1 wherein one of said members has a plurality of grooves in which said bonding material is accommodated.

7. Apparatus according to claim 6 wherein said grooves are annular and formed in that member which is telescoped within the other.

8. Apparatus according to claim 1 including sensor means carried by said arm at said one end thereof for sensing when a workpiece is supported by support means.

9. Apparatus according to claim 8 including mounting means movably mounting said sensor means on said arm.

10. Apparatus according to claim 9 wherein said mounting means comprises a yoke having legs straddling said arm.

11. Apparatus according to claim 10 wherein said sensor means includes a bail pivoted on said legs, said bail being displaceable by a workpiece on said support means.

12. Apparatus according to claim 11 including a proximity sensor adjacent said bail and responsive to movement of said bail to generate an electrical signal.

13. Apparatus according to claim 1, wherein said support means comprises an L-shaped shovel.

14. Transfer apparatus operable to support a workpiece for movement from one position to another, said apparatus comprising a transfer arm having relatively movable first and second sections telescopingly joined to one another; means at one end of said arm for supporting a workpiece; and thermoplastic bonding means interposed between said sections and responsive to temperature variations for respectively enabling and disabling relative linear movement of said sections, said bonding means having a liquefication temperature higher than ambient temperature and being solid at temperatures below said liquefication temperature.

15. Apparatus according to claim 14 wherein said sections are relatively rotatable.

16. Apparatus according to claim 14 wherein said sections are linearly adjustable.

17. Apparatus according to claim 14 wherein said sections are linearly and rotatably adjustable.

18. Apparatus according to claim 14 wherein said sections are of different transverse dimensions, said apparatus including an adjustable bail; means mounting said bail on said arm for movements in response to engagement and disengagement thereof with and from said workpiece; and sensor means carried by said mounting means and operable in response to movements of said bail to generate a signal, said mounting means being mountable on either of said sections.

* * * * *